United States Patent [19]

Lutzker

[11] Patent Number: 4,548,372

[45] Date of Patent: Oct. 22, 1985

[54] LAWN AND LEAF BAG HOLDER

[76] Inventor: Robert S. Lutzker, 21 Lee Avenue, East Williston, N.Y. 11596

[21] Appl. No.: 519,319

[22] Filed: Aug. 1, 1983

[51] Int. Cl.$^4$ ............................................. D65B 67/04
[52] U.S. Cl. ....................................................... 248/99
[58] Field of Search ................................... 248/95-101

[56] References Cited

U.S. PATENT DOCUMENTS

| 3,240,457 | 3/1966 | Backland | 248/99 |
| 3,779,419 | 12/1973 | Heitz | 248/101 |
| 4,021,994 | 5/1977 | Maunprice | 248/101 |
| 4,157,801 | 1/1979 | Elmer | 248/101 |
| 4,196,880 | 4/1980 | Hynes | 248/99 |

Primary Examiner—Reinaldo P. Machado
Assistant Examiner—Alvin Chin-Shue
Attorney, Agent, or Firm—Kane, Dalsimer, Kane, Sullivan and Kurucz

[57] ABSTRACT

A lawn bag holder includes three tubular rods connected end to end by sections of flexible tubing forming a triangular frame onto which the edges of a lawn bag are secured in order to maintain the lawn bag in a wide open position. Elongated resilient clips are used to secure the lawn bag to the frame maintaining the lawn bag in a wide open position.

7 Claims, 5 Drawing Figures

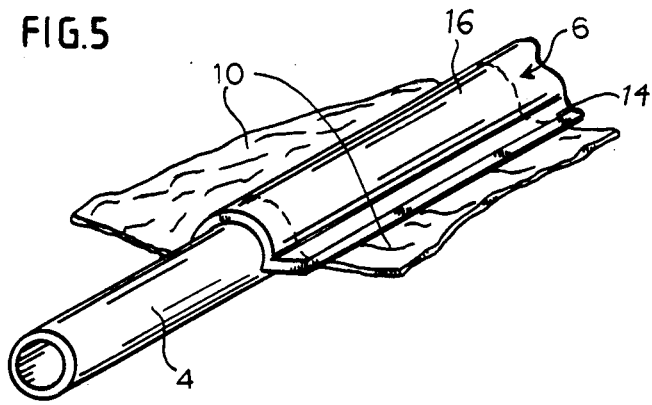
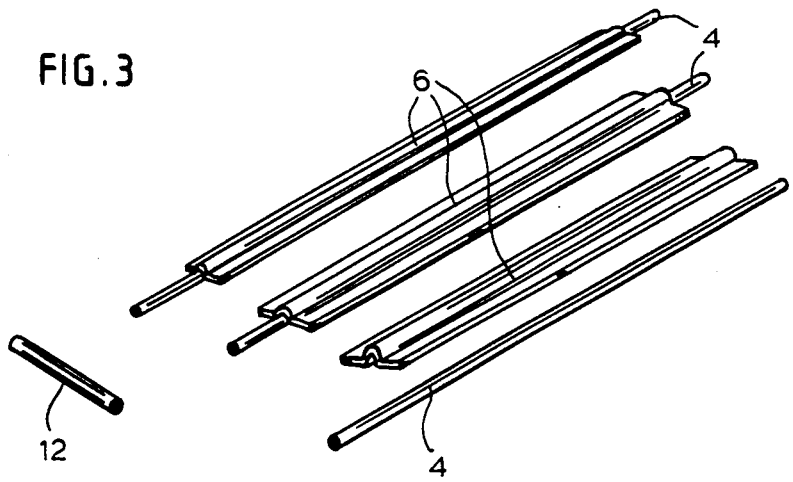

LAWN AND LEAF BAG HOLDER

BACKGROUND OF THE INVENTION

This invention pertains to lawn bag support means.

Various method of facilitating sweeping and gathering of refuse have been developed. To gather loose papers and rubbish a pivoting scoop affixed to the end of a pole into which rubbish is swept is often employed. The dustpan and brush is another means wherein a properly positioned rigid gathering device accepts rubbish pushed by a sweeping means.

At present, to gather fallen leaves, grass cuttings, or other lawn refuse, the refuse is raked into a pile then transferred to a lawn or trash bag. Often a second person is employed to hold the lawn bag while the refuse is pushed into the bag.

Transferring the refuse to the lawn bag without the assistance of a second person is a time consuming frustrating, and dirty task. Grass cuttings may stain clothing. Sharp objects may cause skin lacerations of the type prone to infection. Skin irritations may develop from skin contact with poisonous or irritating materials.

SUMMARY OF THE INVENTION

The present invention provides a triangular lawn bag support. The mouth of the lawn bag is maintained on a wide open position to allow leaves, grass cuttings or other lawn refuse to be easily raked or swept into the bag with one hand while the bag holder is held in the other hand. The triangular configuration of the lawn bag holder allows a broad base for accepting lawn reuse while providing a convenient top for handling.

The lawn bag holder comprises a plurality of rods which are fastened together having clips attached thereto which secure a lawn bag to the holder frame.

The principal object of the present invention is to provide a lawn bag support which facilitates the gathering of leaves and grass cuttings into a lawn bag by maintaining the opening of a lawn bag in a wide open position.

Another object is to provide an inexpensive, lightweight lawn bag support means.

A further object is to provide an easily assembled ready to use lawn bag holder for maximum convenience to the user.

A still further object is to provide a means for bagging leaves and grass cuttings which minimizes the amount of physical exertion necessary, including unnecessary bending, and also minimize skin contact with the refuse.

A still further object is to provide a lawn bag holder which reduces the amount of time necessary to gather leaves or grass cuttings into a lawn bag.

These and other objects and advantages will become apparent from the following detailed description which is to be taken in conjunction with the accompanying drawings.

BRIEF DESCRIPTION OF THE DRAWINGS

FIG. 3 is a perspective view of the invention prior to assembly and prior to cutting the flexible connecting tubing into 3 substantially equal parts;

FIG. 4 is a partial view illustrating the insertion of the rod end into the flexible tubing to fasten adjoining rod ends; and FIG. 5 is a partial view illustrating a lawn bag secured between clip and rod.

DETAILED DESCRIPTION OF THE PREFERRED EMBODIMENT

Figure 2:
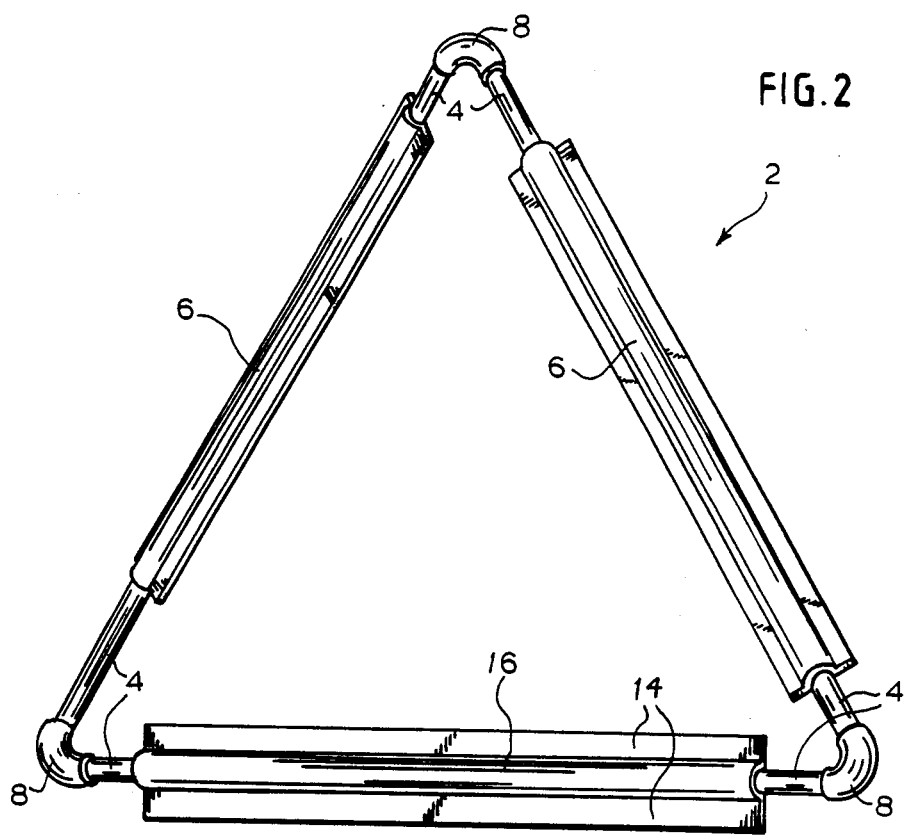
FIG. 2 is a perspective view of the present invention as assembled.
Figure 1:
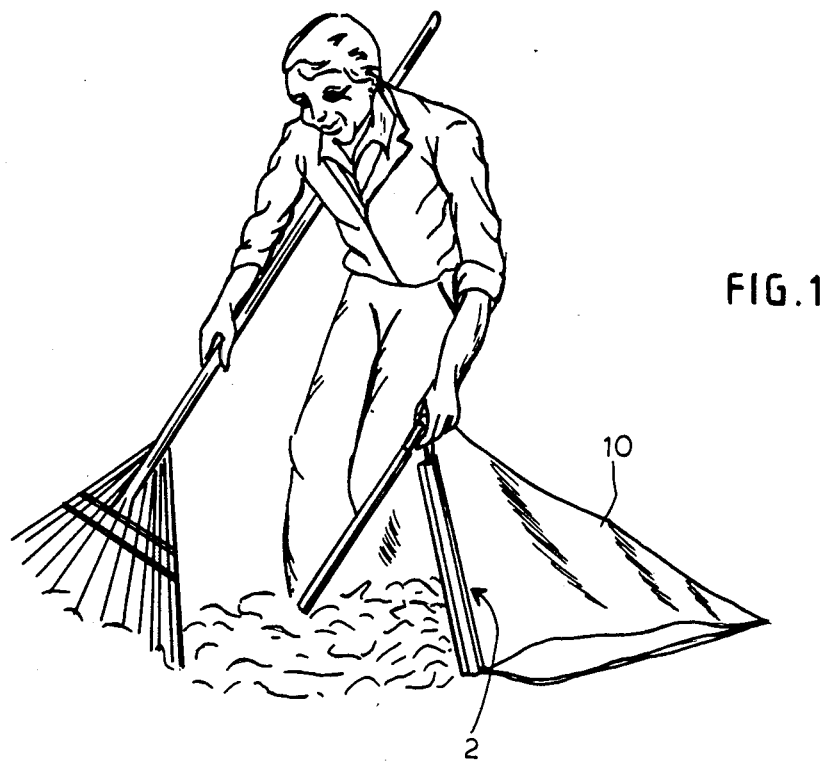
FIG. 1 is a perspective view of the present invention in use.

Lawn bag holder 2 is illustrated in FIG. 2. Rods 4 may be composed of any suitable material preferably a rigid thermoplastic or thermoset plastic tubing. It is contemplated that three rods 4, of substantially equivalent length be used thereby forming a lawn bag holder in the shape of an equilateral triangle. Alternatively, additional rods 4 may be used resulting in a different lawn bag holder configuration.

Flexible connector 8 may be composed of a suitable flexible plastic or rubber tubing. The ends of flexible connector 8 are sized to serve as a female receptacle to each of two adjacent rod ends, adhering thereto by means of a friction fit created by the elastic contraction of flexible connector 8 on the rod end. The rods are thereby securely fastened during use. The end of rod 4 is moistened prior to insertion into flexible connector 8 in order to facilitate manual removal of the rod, if desired, after use.

Flexible connectors 8 are marketed as one piece of flexible tubing 12. The user cuts tubing 12 into three substantially equal parts to serve as connectors for the three rods.

Alternatively, any suitable rod fastening means may be used.

Elongated clips 6 are designed to overlay rod 4 along a substantial portion of its length. Clips 6 are composed of a suitable thermoplastic or thermoset plastic and sized to snap on and overlay rod 4. A clip 6 comprises a partially cylindrical shell portion 16, and flanges 14 extending radially outward from and along the edges of the shell portion 16. It is preferred that clips 6 be shorter in length than rods 4 to facilitate removal of the clips. Extension of rod 4 beyond the clip 6 allows the user to grasp the rod in one hand the clip in the other hand thereby gaining leverage to separate the clip from the rod.

The shell portion 16 has an inner diameter fit to closely overlay the outer diameter of the rod and overlays slightly more than 180 degrees of the surface of cylindrical rod 4. Thus when clip 6 is secured to rod 4 the opposite edges of shell portion 16 are spaced apart a distance less than the external diameter of rod 4. Thus to overlay rod 4 the resilient shell portion 16 is snapped onto rod 4, the edges expanding to accommodate the rod at the point at which the edges are diammetrically opposed, then contracting in accordance with the shape of rod 4 securing a section of lawn bag 10 therebetween. The edges of lawn bag 10 on its open end, may be fastened to lawn bag holder 2 along the length of the edges thereby creating and maintaining a triangular lawn bag opening.

Alternately, a plurality of smaller clips may be used to secure the lawn bag to the lawn bag holder.

To assemble lawn bag holder 2 firstly rods 4 and flexible connectors 8 are assembled into a triangular frame. Next the edges of the open end of a suitable lawn or trash bag 10 are lain over the frame so that the lawn bag is in a wide open position. Elongated clips 6 are then snapped onto rods 4 of the frame, securing lawn bag 10 thereto. Removal of lawn bag 10 from lawn bag holder 2 is easily accomplished by removal of clips 6 from rods 4 and withdrawal of lawn bag 10 from the frame.

Although a preferred embodiment of the invention has been disclosed and described in detail herein, it should be understood that the invention is in no sense limited thereby and its scope is to be determined by that of the appended claims.

What is claimed is:

1. A lawn bag holder comprising:
   a plurality of elongated rods, the plurality of rods comprising at least three rods, the rods comprising a cylindrical polymeric tubing and being substantially straight end to end;
   a means for fastening the rods together end to end in a substantially straight sided geometrical configuration, he fastening means comprising flexible tubing;
   a plurality of clips attached to the rods and overlying a substantial portion of the length of the rods in order to secure a lawn bag thereto, the clips being shorter in length than the rods to which they are attached, the clips being elongated partially cylindrical shell sections composed of a resilient polymeric material, the partially cylindrical shell section having an inner diameter fit to closely overlay the outer diameter of the rod, and the inner portion of the shell portion overlaying more than 180 degrees of the surface of the rod so that the edges of the shell portion are spaced a distance less than the outer diameter of the rod when the clip is in place, lateral flanges extending along and substantially radially outward from the edges of the partially cylindrical shell section to facilitate removal of the clips from the rods, each rod having an end portion extending beyond the corresponding end of the clip to permit the rod to be grasped in one hand and the clip flanges in the other hand thereby gaining leverage to separate the clip from the rod.

2. The invention in accordance with claim 1 wherein the flexible tubing fastens the rods end to end by serving as a female receptacle to each of 2 adjacent rod ends and adhering to the rod ends by means of a friction fit therebetween.

3. The invention in accordance with claim 1 wherein the flexible tubing is of sufficient length so that it may be cut into a plurality of sections, each section capable of fastening a rod end to an adjacent rod end.

4. A lawn bag holder comprising:
   a plurality of elongated rods, the plurality of rods comprising three rods comprising a cylindrical polymeric tubing;
   a means for fastening the rods together, the three rods being fastened end to end in the shape of a triangle, the fastening means comprising flexible tubing;
   a plurality of clips attached to the rods and overlying a substantial portion of the length of the rods in order to secure a lawn bag thereto, the clips being shorter in length than the rods to which they are attached, the clips being elongated partially cylindrical shell sections composed of a resilient polymeric material, the partially cylindrical shell section having an inner diameter fit to closely overlay the outer diameter of the rod, and the inner portion of the shell portion overlaying more than 180 degrees of the surface of the rod so that the edges of the shell portion are spaced a distance less than the outer diameter of the rod when the clip is in place, lateral flanges extending along and substantially radially outward form the edges of the partially cylindrical shell section to facilitate removal of the clips from the rods, each rod having an end portion extending beyond the corresponding end of the clip to permit the rod to be grasped in one hand and the clip flanges in the other hand thereby gaining leverage to separate the clip from the rod.

5. The invention in accordance with claim 4 wherein the rods are substantially equal in length.

6. A lawn bag holder comprising:
   three elongated tubular rigid plastic cylindrical rods fastened end to end in the shape of a triangle;
   three sections of flexible tubing which serve as a means for fastening the rods end to end at the three rod junctures, each section of tubing sized to accept each of two adjacent rod ends as a female receptacle, the flexible tubing adhering the rod end thereto by means of a friction fit therebetween;
   three elongated resilient plastic clips, one overlaying a substantial portion of each rod, each clip having a partially cylindrical shell portion which has an inner diameter substantially equal to the outer diameter of the rod, said shell portion sized to overlay more than 180 degrees of the surface of the rod so that the resilient clip may be snapped onto the rod, securing a section of lawn bag therebetween, and having flanges extending along and substantially radially outward from the edges of the shell portion, each rod having an end portion extending beyond the corresponding end of the clip to permit the rod to be grasped in one hand the clip flanges in the other hand thereby gaining leverage to separate the clip from the rod.

7. The invention in accordance with claim 6 further comprising a lawn bag the edges of the open end of which are disposed along the rods and secured thereto by the resilient clips so that the bag is maintained in a wide open position.

* * * * *

UNITED STATES PATENT AND TRADEMARK OFFICE
CERTIFICATE OF CORRECTION

PATENT NO. : 4,548,372
DATED      : October 22, 1985
INVENTOR(S): Robert S. Lutzker It is certified that error appears in the above-identified patent and that said Letters Patent is hereby corrected as shown below:

Column 1, line 33, "reuse" should be --refuse--;

Column 2, line 42 after "hand" insert --and--;

Column 3, line 17, (Claim 1) "he" should be --the--;

Column 3, line 55, (Claim 4) after "rods" insert --, the rods--; and

Column 4, line 48, (Claim 6) after "hand" insert --and--.

Signed and Sealed this

Twenty-first Day of January 1986

[SEAL]

Attest:

DONALD J. QUIGG

*Attesting Officer*  *Commissioner of Patents and Trademarks*